US007069255B1

(12) United States Patent
Seiler et al.

(10) Patent No.: US 7,069,255 B1
(45) Date of Patent: Jun. 27, 2006

(54) METHOD AND DEVICE FOR OPTIMISING PROCESS MANAGEMENT AND PROCESS CONTROL IN AN ARRANGEMENT FOR PRODUCING FARINACEOUS PRODUCTS

(75) Inventors: Werner Seiler, Zuberwangen (CH); Hans Tobler, Algetshausen (CH); Franz Guster, Amegg (CH); Marcel Bruhwiler, St. Gallen (CH); Mukul Agasrwal, Zurich (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/958,535

(22) PCT Filed: Mar. 21, 2000

(86) PCT No.: PCT/CH00/00163

§ 371 (c)(1),
(2), (4) Date: Feb. 4, 2002

(87) PCT Pub. No.: WO00/66963

PCT Pub. Date: Nov. 9, 2000

(30) Foreign Application Priority Data

Apr. 28, 1999 (DE) ................................ 199 19 206

(51) Int. Cl.
*G06N 3/08* (2006.01)
*G06N 7/02* (2006.01)
*A23L 1/16* (2006.01)

(52) U.S. Cl. ............................ 706/15; 706/23; 700/29; 426/458; 426/496

(58) Field of Classification Search .................. 706/15
See application file for complete search history.

(56) References Cited

U.S. PATENT DOCUMENTS

| | | | | | |
|---|---|---|---|---|---|
| 4,775,542 | A | * | 10/1988 | Manser et al. | 426/458 |
| 4,954,359 | A | * | 9/1990 | Pratolongo | 426/557 |
| 5,026,567 | A | * | 6/1991 | Manser et al. | 426/458 |
| 5,101,717 | A | * | 4/1992 | Manser et al. | 99/474 |
| 5,186,539 | A | * | 2/1993 | Manser et al. | 366/85 |
| 5,402,367 | A | * | 3/1995 | Sullivan et al. | 706/6 |
| 5,989,620 | A | * | 11/1999 | Wang et al. | 426/634 |
| 6,112,126 | A | * | 8/2000 | Hales et al. | 700/29 |

* cited by examiner

*Primary Examiner*—Anthony Knight
*Assistant Examiner*—Nathan H. Brown, Jr.
(74) *Attorney, Agent, or Firm*—Francis C. Hand; Carella, Byrne, Bain, et al.

(57) ABSTRACT

The invention relates to a method and a device for optimising process management and process control in an arrangement for producing, especially short and long, farinaceous products. The aim of the invention is to improve dryer regulation and reduce faulty production. To this end, a dryer climate regulator using online sensors (9) and intelligent software technologies is provided.

26 Claims, 2 Drawing Sheets

Figure 1:
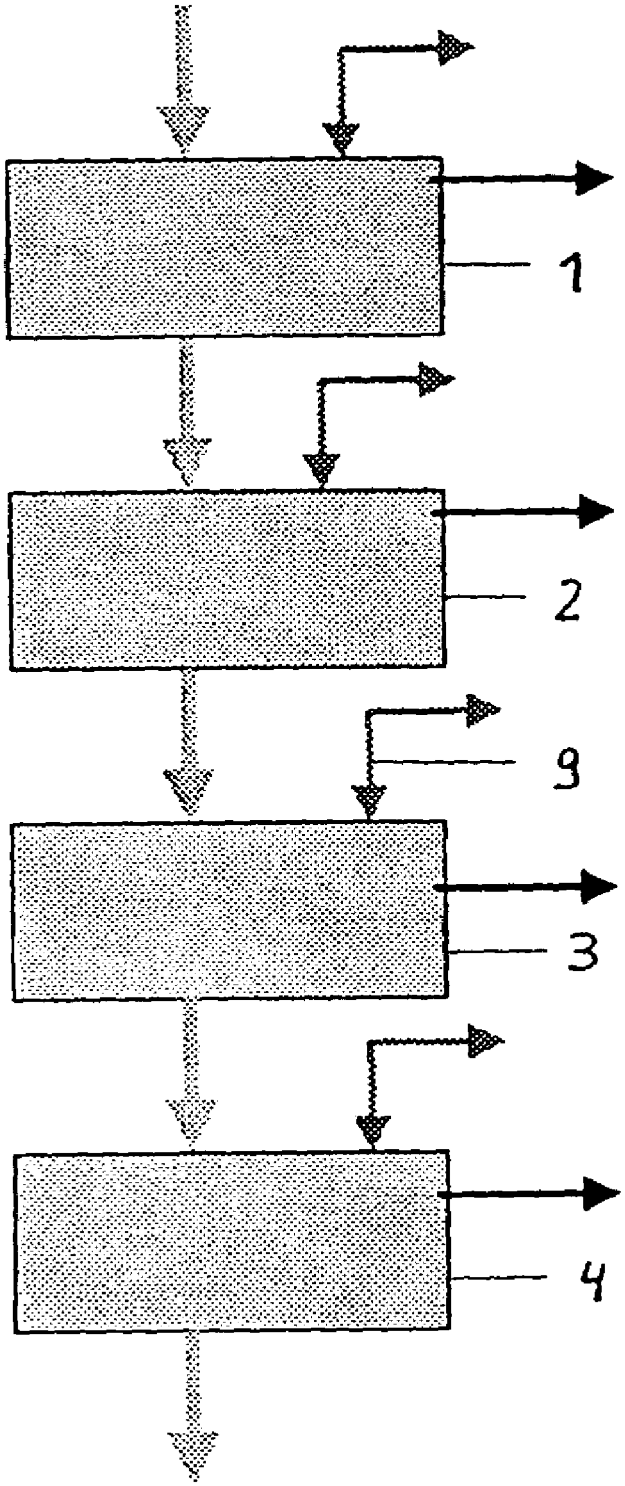

METHOD AND DEVICE FOR OPTIMISING PROCESS MANAGEMENT AND PROCESS CONTROL IN AN ARRANGEMENT FOR PRODUCING FARINACEOUS PRODUCTS

The invention concerns a method for optimising process control and monitoring in a plant for the production of pasta (farinaceous) products, in particular short and long pasta products, and equipment for implementing the method.

The industrial production of pasta products already takes place with a comparatively high level of automation. This concerns for example the part-processes of pressing the raw pasta products and the drying and cooling thereof. Thus, EP-A-0 129 892 B1 describes a plant and a method for the drying of long pasta products in continuous operation, with controlled heating, humidification, drying and cooling of the pasta products. A temperature-time regime in a turbosystem is specified. EP-A-0 540 699 B1 describes a more refined method for regulating the humidity of the product in order to avoid breaking of the pasta products after drying and during packaging. The temperature and air humidity are controlled. In this, during the final drying zone and while the pasta products are still warm, water is again applied at their surface and the temperature of the pasta products is reduced to below 60° C. immediately after this addition of water. A similar solution using an "Aw" value is proposed by EP-A-0 322 053 B1.

Automated presses for the production of the raw pasta products are described, for example, in EP-A-0 426 766 B1 in the form of a mixing kneader comprising two working shafts with alternating kneading worms and shear elements, or in DE-44 17 357 A1.

The technical sequence and in part the process parameters are available as control data. Plant control systems enable the sequence to be controlled appropriately for selected processes, with visualisation of the plant condition. As regards the sensors, for example temperature and humidity sensors, rotation speed indicators or pressure probes are known. However, no on-line optimisation is possible because of varying raw material values, machine wear, or sensor deviations. Known problem areas relate to the raw material (quality and humidity variations in the flour and dough, etc.), the ambient climatic condition, fluctuations of the raw dough humidity and the drying conditions, also in combination with the training of the operating personnel, non-constant machine properties and other factors.

On-line measurements in the moist and hot atmosphere of a dryer and on various products are also very problematic.

DE-44 33 593 A1 describes a method for controlling an extruder, in which on the basis of experimental data or expert knowledge nominal value specifications for regulation are established whose settings depend on product quality. By means of these nominal value specifications a working point is optimised and stabilised, and a regulator integrated in the machine control system is set. This regulator can be a fuzzy-logic regulator for process control. Following the input and storage of the data determined, adjustments for specific controlled systems are adapted automatically and specific corrections are generated, the latter using code generators integrated into the regulation environment.

To implement the method an in-line viscosity sensor is installed between the nozzle and the tip of the extruder's worm conveyor.

DE-197 34 711 C1 describes a regulator with time-discrete, dynamic fuzzy control elements in which non-linearities appropriate for a desired regulating action can be established.

DE-196 18 900 A1 describes a method for controlling and regulating the heat treatment of material in strip form, in particular textile strip acted upon by a stream of gaseous treatment medium. Based on the knowledge of a specialist in the field, a regulation strategy is individually specified, which is implemented by means of a fuzzy-logic regulator known as such. In this, certain processes parameters such as the temperature of the material at the inlet and outlet of the dryer, the air circulation temperatures and the humidity of the material at the inlet and outlet are determined and serve as inputs for the fuzzy regulator. The output of the fuzzy regulator serves to control the throughput speed of the material.

A similar method is disclosed in DE-44 35 808 A1. Here, in a process for the drying of compressed chips the moisture content of the chips is determined gravimetrically. The gravimetrically determined moisture content, together with other parameters such as temperature values or the quantity of compressed chips, are transmitted to the input of a fuzzy-logic unit. The output signal from the fuzzy unit is used as a control signal for the chip drying process taking into account the varying moisture content.

U.S. Pat. No. 5,619,614 discloses a fuzzy-logic control system for a coin-operated washing machine and coin-operated laundry dryer for a laundrette, whereby the operating parameters for the washing and drying processes are controlled.

The purpose of the present invention is to develop optimisation methods for the process control of individual part-processes in a plant for the production of pasta products, in particular short and long pasta products or suchlike, which enable improved press and dryer control and process monitoring with the aid of intelligent software technologies. Its particular aims are to achieve simpler regulator adjustment and to reduce defective production. These objectives are achieved by the characteristics specified in Claim 1.

The objectives are achieved thanks to the characteristics of Claim 1, by using intelligent software technology such as a virtual sensor (also referred to as a "soft sensor") for the end product humidity, with regulation of the metered quantity of water added in the press. The end product humidity can be kept within acceptable limits. Until now it has not been possible to obtain information about the condition of the product in the dryer. In addition, on-line sensors in the dryer for product humidity measurement and/or weight loss measurement enable the ambient climate and product humidity curves to be controlled.

The invention is founded upon recognition that the individual part-processes are interdependent so that point-by-point optimisation promises little hope of success. Its basis is the interaction between product properties and machine behaviour. To take this into account, models are established between the process parameters (machine settings, raw materials, recipe mixtures) and the product properties (e.g. moisture content, colour, viscosity) by means of statistical and intelligent software technologies.

Intelligent software technologies (also referred to as "soft computing") include technologies such as expert systems, neuronal networks, fuzzy logic and genetic algorithms (evolutionary algorithms). These are described, for example, in the article "Soft Computing in Automation" by P. Auer, Elektronik 34/1998.

By combining these technologies (e.g. neuro-fuzzy), hybrid models are produced which can take into account both already existing expert knowledge (e.g. with fuzzy rules) and experimental data (for example, produced by statistical test planning and process tests and modelled in neuronal networks). In addition, these models are combined with conventional analytical models (for example, based on physical models or regression calculations), and are also referred to as hybrid.

In particular, new methods are also becoming available, which enable the automatic generation of models (e.g. automatic generation of the structure and parameters of neuronal networks, for example by means of genetic algorithms or the automatic generation of fuzzy rules from process data). This makes for simpler adaptive on-line model adaptation.

With the aid of these models, optimisation in relation to product properties, process parameters and even costs (raw material costs, operating costs) is made possible, so enabling objective-orientated, model-based adaptive regulation. In particular, non-linear systems too can be more effectively regulated thereby.

A further objective is to provide equipment for implementing the method.

The result is an adaptive regulation system for the production of pasta products, relating to the pressing of the raw pasta products and their drying/cooling, whereby the plant can be operated regardless of the personnel. Although adaptive regulation systems for simple processes are known, these cannot be extended to processes of such complexity.

Sensors already present can be used.

Likewise, known electro-pneumatic controls for climate regulation in the dryers can be replaced by electromechanical and self-teaching regulators.

In addition, a more gentle transfer from the dryer/cooler into the ambient atmosphere is achieved by taking the ambient climate into account, so that stresses in the product and therefore distortion and breaking up of the pasta products is minimised.

By means of an on-line regulation system process disturbances are automatically compensated by a reproducible, direct or virtual on-line measurement of the product humidity. By measurement of the ambient climate and adaptation of the dryer climate in the individual zones, the end product can be stabilised and, in particular, the break-up frequency of the end product on the way to the silo is reduced.

The on-line regulation system enables the final quality criteria of the product to be maintained at constant values over long periods, during production and even when process disturbances occur. In particular, the product-related control magnitudes (e.g. product humidity) are regulated. Each control magnitude should be measurable and error magnitudes should be reduced. For end-product stabilisation the ambient climate should be taken into account in the on-line control of the climate of individual dryer zones and, if necessary, also in the product ventilation. The pasta product presses can also be used as virtual sensors for product properties such as dough humidity and dough consistency.

A recipe assistant automatically provides a first specification of the recipe values required for the specific, desired product properties. For this, initial recipe values are generated from product specifications. On the basis of learned data, expert knowledge and the physical circumstances, a modelling process takes place and the recipe values are calculated from the specifications. When the product changes, a comparison is made to see whether the recipe values for the new product specifications are sufficiently similar.

Subsequent recipe optimisation is effected by fine adjustment of the first recipe specifications and a diagnosis is carried out to recognise and distinguish coarse errors, the operator receiving indications of which errors he should control and eliminate.

In the recipe optimisation stage the initial values are optimised when the recipe is first used and relationships between deviations from target values and adjustment magnitude variations are modelled. The operator can set the target criteria to a desired value and new adjustment magnitudes can be set automatically. Manual adaptations are also possible.

Below, an embodiment of the invention is described in more detail with reference to a drawing, which shows:

FIG. 1: Schematic sequence in a pressing device for pasta products, and

Figure 2:
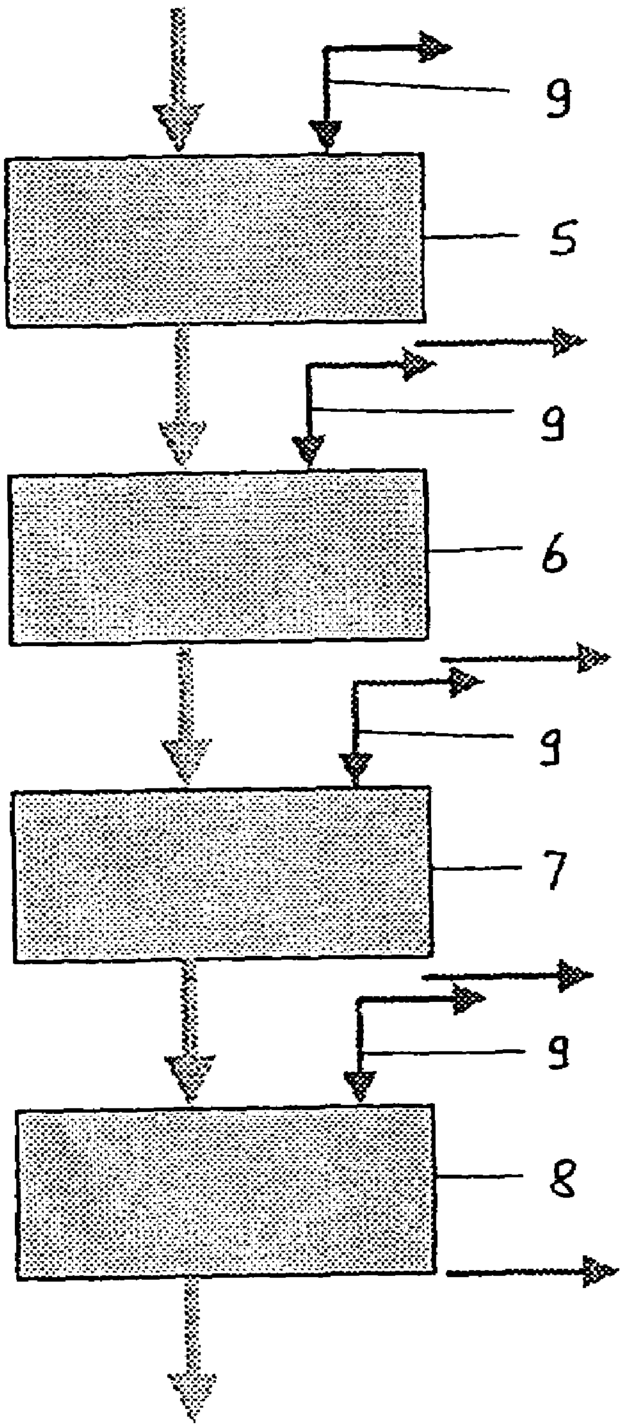

FIG. 2: Schematic sequence in a dryer/cooler.

From a metering unit 1 in which gruel and/or flour and water and additives are metered and mixed, the raw materials pass into a mixing kneader 2, for example one of the type described in to EP-A-0 426 766 B1, where the raw materials are intensively mixed and kneaded to form a raw dough.

At the end of the mixing and kneading process the raw dough passes into a screw press 3 of the mixing kneader 2, by which the raw pasta product is produced. In the case of long products this is followed by a diffuser 4.

Thereafter, the moist raw pasta product with a moisture content of around 30% passes into a vibratory dryer 5 and thence into the pre-dryer 6 and the final dryer 7 and cooler 8, in which a drying process according to EP-A-129892 and/or EP-A-540699 takes place. The pasta product leaves the cooler with a product humidity usually of 11–13%, preferably 12.5%. The dried pasta product is then cut up and packaged in the usual way.

In the individual sections of the dryer 5, 6, 7 and in the cooler 8 the product humidity and weight loss of the pasta product are determined continuously by on-line sensors 9. It is also possible to position such an on-line sensor 9 in the screw press 3 or in the diffuser 4.

By virtue of the resultant climate regulation, the product humidity can be maintained very close to the optimum 12.5% and thereby, ultimately, defective production can be reduced considerably while maintaining a constant quality of the pasta product.

INDEX NUMBERS

1 Metering unit
2 Mixing kneader
3 Screw press
4 Diffuser
5 Vibratory dryer
6 Pre-dryer
7 Final dryer
8 Cooler
9 On-line sensor

The invention claimed is:

1. Method for optimising the control and monitoring of processes for the production of pasta products, in particular for the production of long or short pasta products, in which raw materials are kneaded intensively in a mixer/kneader and the raw pasta product emerging from a screw press in the form of moist and plastic strands of dough is passed through climate zones of a dyer heated differently and/or with different humidities until final drying, and is then cooled and stabilised in shape with a final moisture content lower than 14%, characterised in that automatic, self-controlling and regulating product quality regulation by means of intelligent software technologies and on-line sensors takes place in each of the mixer/kneader, the screw press, at least one climate zone of the dryer and a diffuser between the screw press and dryer to control and monitor at least one of the moisture content and humidity therein, overriding the traditional control system and line controls during the production process of pasta products, such that the process control and monitoring extends over and to all the part-processes and such that models are set up by the statistical and intelligent software technologies between the process parameters and the properties of the product.

2. Method according to claim 1, characterised in that a product humidity measurement and/or weight loss measurement of the pasta products takes place "on-line" during the processing, in particular during the drying.

3. Method according to claim 2, characterised in that a climate curve in the dryer is regulated.

4. Method according to claim 3, characterised in that a pre-established, optimum product humidity curve or drying curve is regulated.

5. Method according to any one of claims 1 to 4, characterised in that neuronal networks are used for the modelling, optimisation and regulation.

6. Method according to any one of claims 1 to 4, characterised in that a fuzzy-logic system or an expert system is used for the modelling, optimisation and regulation.

7. Method according to any one of claims 1 to 4, characterised in that analytical models are used for the modelling, optimisation and regulation.

8. Method according to any one of claims 1 to 4, characterised in that hybrid models are used for the modelling, optimisation and regulation.

9. Method according to claim 8, characterised in that a combination of at least two of a neuronal network, a fuzzy-logic system and an expert system are used for the hybrid models.

10. Method according to claim 8, characterised in that a combination of at least two of a neuronal network, a fuzzy-logic system, an expert system and an analytical model are used for the hybrid models.

11. Method according to claim 1 characterised in that genetic algorithms or other optimisation algorithms are used for the modelling, optimisation and regulation.

12. Method according to claim 1, characterised in that instead of on-line sensors, virtual sensors are used.

13. Method according to claim 12, characterised in that a pasta product press is used as a virtual sensor for product properties such as dough humidity and dough consistency.

14. Method according to claim 1 characterised in that a first specification of the recipe values required for specific product properties is given.

15. Method according to claim 1 characterised in that when new products are developed a first specification of the recipe values required for specific product properties is given.

16. Method according to claim 1 characterised in that initial values are optimised when processing starts and relationships between deviations from target magnitudes and adjustment magnitude alterations are modelled.

17. A method of optimising the control and monitoring of a process for the production of a pasta product comprising the steps of establishing a first specification of the product properties for a pasta product;

establishing process parameters for passing the materials for the pasta product through a mixer/kneader, a screw press, a diffuser, a dryer and a cooler;

establishing in an intelligent software technology a first model for the product properties and a second model for the process parameters;

intensively kneading raw materials for making the pasta product in the mixer/kneader;

passing the kneaded material through the screw press;

providing one of an on-line sensor and a virtual sensor in the screw press to monitor the moisture content of the kneaded material therein and delivering a responsive signal in dependence on the moisture content;

delivering the kneaded material from the screw press through the diffuser in the form of moist plastic strands of dough into and through climate zones of the dryer having different heat and/or humidity conditions from each other to dry the strands to a final condition;

providing one of an on-line sensor and a virtual sensor in each of at least one zone of the dryer and the diffuser to monitor the humidity of the strands in the diffuser and the dryer and delivering a responsive signal in dependence on the humidity content;

thereafter cooling and stabilizing the strands to a final moisture content in the cooler;

providing one of an on-line sensor and a virtual sensor in the cooler to monitor at least one of the humidity and weight loss of the strands in the cooler and delivering a responsive signal in dependence on the humidity content;

automatically determining a deviation in the product properties from said first model in response to said responsive signals from the screw press, dryer and cooler; and automatically adjusting at least one of the process parameters and the humidity of at least one of the screw press, dryer and cooler in response to a determined deviation to obtain a final moisture content lower than 14% in the strands.

18. A method as set forth in claim 17 further comprising the stop of adjusting the humidity in the dryer in dependence on a climate curve.

19. A method as set forth in claim 17 further comprising the step of adjusting the humidity in at least one of the screw press, dryer and cooler in dependence on at least one of a predetermined optimum product humidity curve and a predetermined optimum product drying curve.

20. A method as set forth in claim 17 wherein said steps of comparing the responsive signals with said first model and adjusting the humidity of at least one of the screw press, dryer and cooler are performed in a neuronal network.

21. A method as set forth in claim 17 wherein said steps of comparing the responsive signals with said first model and adjusting the humidity of at least one of the screw press, dryer and cooler are performed in a fuzzy-logic system.

22. A method as set forth in claim 17 wherein said steps of comparing the responsive signals with said first model and adjusting the humidity of at least one of the screw press, dryer and cooler are performed using analytical models.

23. A method as set forth in claim 17 wherein said steps of comparing the responsive signals with said first model and adjusting the humidity of at least one of the screw press, dryer and cooler are performed using hybrid models.

24. A method as set forth in claim 17 wherein said steps of comparing the responsive signals with said first model and adjusting the humidity of at least one of the screw press, dryer and cooler are performed using one of a genetic algorithm and an optimization algorithm.

25. An apparatus for making a pasta product comprising a metering unit for mixing and metering raw materials for a pasta product;

a mixer/kneader for receiving and intensively kneading the raw materials from said metering unit;

a screw press for receiving the kneaded materials from said mixer/kneader and passing the kneaded materials therefrom in the form of moist plastic strands of dough;

at least one of an on-line sensor and a virtual sensor in said screw press to monitor the moisture content of the kneaded material therein and delivering a responsive signal in dependence on the moisture content;

a diffuser for passage of the strands of dough therethrough;

at least one of an on-line sensor and a virtual sensor in said diffuser to monitor the moisture content of the strands of dough therein and delivering a responsive signal in dependence on the moisture content;

a dryer for receiving the strands of dough from said diffusor, said dryer having climate zones having different heat and/or humidity conditions from each other to dry the strands to a final condition;

at least one of an on-line sensor and a virtual sensor in at least one zone of said dryer to monitor the humidity of the strands in said dryer and to deliver a responsive signal in dependence on the humidity content;

a cooler for cooling and stabilizing the strands from said dryer to a final moisture content; and at least one of an on-line sensor and a virtual sensor in said cooler to monitor at least one of the humidity and weight loss of the strands in said cooler and delivering a responsive signal in dependence on at least one of the humidity and weight loss of the strands therein.

26. An apparatus as set forth in claim 25 further comprising a control system connected to each said sensor for receiving said responsive signals therefrom.

* * * * *